United States Patent [19]

McGarvey

[11] Patent Number: 5,505,464
[45] Date of Patent: Apr. 9, 1996

[54] MINIMUM DEAD VOLUME FITTING

[75] Inventor: Raymond C. McGarvey, Bethesda, Md.

[73] Assignee: General Components, Inc., Gaithersburg, Md.

[21] Appl. No.: 937,560

[22] Filed: Aug. 31, 1992

Related U.S. Application Data

[63] Continuation-in-part of Ser. No. 694,066, May 1, 1991, Pat. No. 5,222,747, and Ser. No. 652,225, Feb. 6, 1991, abandoned, which is a continuation of Ser. No. 392,460, Aug. 11, 1989, abandoned.

[51] Int. Cl.$^6$ ................................. F16J 15/08
[52] U.S. Cl. ................. 277/1; 277/167.5; 277/168; 277/236; 285/336; 285/917
[58] Field of Search .................. 277/207 A, 236, 277/167.5, 168, 169, 170, 1; 285/917, 80, 139, 343, 353, 354, 382, 390, 336

[56] References Cited

U.S. PATENT DOCUMENTS

| | | | |
|---|---|---|---|
| Re. 34,144 | 12/1992 | Leigh . | |
| 508,765 | 11/1893 | Rouse | 277/167.5 |
| 582,575 | 5/1897 | Bayles | 255/363 X |
| 906,761 | 12/1908 | White | 285/336 |
| 1,477,696 | 12/1923 | Dollman | 285/331 X |
| 1,819,036 | 8/1931 | Oberhuber | 285/336 |
| 1,821,865 | 9/1931 | Wilson | 277/180 |
| 1,821,866 | 9/1931 | Wilson | 277/180 X |
| 1,836,198 | 12/1931 | Spyer | 285/363.1 X |
| 1,866,636 | 7/1932 | Fantz | 285/334.2 X |
| 2,561,884 | 7/1951 | Perrow | 277/7 A X |
| 2,576,012 | 11/1951 | Gurck | 277/7 A X |
| 2,688,500 | 9/1954 | Scott | 277/158 X |
| 2,789,844 | 4/1957 | Kessler | 285/336 |
| 3,015,510 | 1/1962 | Bates | 277/207 A X |
| 3,208,758 | 9/1961 | Carlson et al. | 277/171 |
| 3,239,245 | 3/1966 | Press et al. | 285/354 X |
| 3,302,953 | 2/1967 | Glasgow | 277/180 |
| 3,368,818 | 2/1968 | Asamaki et al. | 285/336 X |
| 3,482,860 | 12/1969 | Dawbarn et al. | 285/354 |
| 3,521,910 | 7/1970 | Callahan, Jr. et al. | 285/422 X |
| 3,556,568 | 1/1971 | King | 277/236 X |
| 3,561,793 | 2/1971 | Rode | 285/13 |
| 3,578,346 | 5/1971 | Jelinek | 277/180 |
| 3,669,474 | 6/1972 | Bode | 285/365 |
| 3,747,963 | 7/1973 | Shivak | 285/328.1 X |
| 3,765,707 | 10/1973 | Westburg | 285/336 |
| 3,986,721 | 10/1976 | Decker | 277/180 X |
| 4,026,565 | 5/1977 | Jelinek | 277/180 |
| 4,168,852 | 9/1979 | Ahlstone | 285/336 |
| 4,294,477 | 10/1981 | Ahlstone | 277/180 X |

(List continued on next page.)

FOREIGN PATENT DOCUMENTS

| | | | |
|---|---|---|---|
| 278085 | 3/1965 | Australia | 277/207 A |
| 393855 | 11/1965 | Switzerland | 277/180 |
| 0374479 | 3/1973 | U.S.S.R. | 285/917 |
| 0926789 | 5/1963 | United Kingdom | 277/180 |
| 3495 | 4/1989 | WIPO . | |

Primary Examiner—Scott W. Cummings
Attorney, Agent, or Firm—Lane, Aitken & McCann

[57] ABSTRACT

A face sealing fitting includes two connectable tubular elements each having an annular end formation and a metal gasket including an outer annular section with a first axial dimension, an inner annular section concentric with the outer annular section and having a smaller axial dimension, and a tapered section having bevel faces between the inner and outer annular sections. Portions of the annular end formations which project axially the farthest beyond the tubular elements have a diameter substantially equal to the inner diameter of the inner annular gasket section and lie along the inner surface of the tubular elements to minimize dead volumes along the flowpath through the fitting. In some embodiments, the fitting is tightened from a first position, in which the inner diameter of the gasket is smaller than the inner diameter of the first and second tubular elements, to a second position, in which the inner diameter of the tubular gasket is equal to the inner diameter of the first and second tubular elements. In the second position, the fitting is in an optimal sealing condition, and there is zero dead volume in the flowpath.

23 Claims, 8 Drawing Sheets

U.S. PATENT DOCUMENTS

| | | | |
|---|---|---|---|
| 4,303,251 | 12/1981 | Harra et al. | 277/236 |
| 4,403,795 | 9/1983 | Davlin | 285/334.2 X |
| 4,407,516 | 10/1983 | Le et al. | 285/917 X |
| 4,616,860 | 10/1986 | Faria et al. | 277/167.5 X |
| 4,674,756 | 6/1987 | Fallon et al. | 277/180 X |
| 4,838,583 | 1/1989 | Babuder et al. | 285/354 |
| 4,854,597 | 8/1989 | Leigh . | |
| 4,856,828 | 8/1989 | Kessler et al. | 285/910 X |
| 4,861,076 | 9/1989 | Newman et al. | 285/354 X |
| 5,040,714 | 8/1991 | McManigal | 277/236 X |
| 5,066,051 | 11/1991 | Weigl et al. | 285/328 |
| 5,087,085 | 2/1992 | McGarvey . | |
| 5,129,688 | 7/1992 | McGarvey | 285/328 |
| 5,135,269 | 8/1992 | Babuder | 285/917 X |
| 5,145,219 | 9/1992 | Babuder | 277/236 X |
| 5,163,721 | 11/1992 | Babuder | 285/917 X |
| 5,222,747 | 6/1993 | McGarvey . | |

MINIMUM DEAD VOLUME FITTING

CROSS-REFERENCE TO RELATED APPLICATIONS

This is a continuation-in-part of Ser. No. 07/652,225, now abandoned, which is a continuation of Ser. No. 07/392,460, now abandoned. This is also a continuation-in-part of Ser. No. 07/694,066, now U.S. Pat. No. 5,222,747.

BACKGROUND OF THE INVENTION

The present invention relates to a face-seal fitting employing a metal gasket for connecting conduits used in applications requiring special cleanliness, wherein the fitting has minimum dead volume at the interior of the conduits.

Face-seal fittings in the prior art employed gaskets which were in the form of simple circular annuluses, the shape of which provided no aid in alignment or in sealing, or which had a substantial surface or area projecting inside the seal, thereby defining crevices, or dead volumes, which were subject to the problem of entrapping material from the fluid carried by the fitting in which the gasket was employed. Such entrapped material can accumulate and later break off and flow with a fluid conveyed by the fitting, thereby contaminating semiconductor or other materials requiring special cleanliness.

A gasket disclosed in U.S. Pat. No. 4,854,597 issued to Leigh improves over the gaskets of the prior art in that a region of the gasket with conical, or bevel, faces connects a wider outer ring and a narrower inner ring which both have sidewalls perpendicular to an axis formed by the tubular members. This shape causes the elements of the fitting to align with the gasket so that a uniform sealing force on both sides of the gasket is achieved. Moreover, by virtue of the fact that the bead is rounded in axial cross section, sealing is provided along a single high-pressure line of contact, which enables a large sealing force to be applied on each side of the gasket. These advantages are provided while at the same time only a small area of the gasket projects into the fluid stream so that there is little area for entrapping material from said fluid flowing through the fitting.

SUMMARY OF THE INVENTION

By the present invention, a fitting is provided in which the small area of the fitting which might entrap material from the fluid flowing through the fitting is minimized to produce a minimum dead volume condition and, in some embodiments, a zero dead volume condition. At the same time, the shape of the gasket still causes the elements of the fitting to align with the gasket and provides sealing substantially along two annular lines. These advantages are achieved by the provision, on the glands or other tubular members which comprise the fitting, of annular noses which engage opposite sides of the sealing gasket along the inner surfaces of the tubular members which define the flowpath for the fluid. Furthermore, each nose has, in axial cross section, a rounded outer profile shaped and positioned to seal against the gasket principally along two circumferential lines, a first high-pressure line where the rounded outer profile engages a conical face on the sealing gasket and a second line where the rounded outer profile engages a central circular section of the sealing gasket.

Furthermore, it has been discovered that when fittings having gaskets including conical, or bevel, surfaces, such as the gaskets of the above-identified parent applications, are assembled and tightened, a central opening through the gasket, which is intended to be substantially flush with the inner surfaces of tubular members defining a flow passage, is enlarged by the force of the beads or noses at the ends of the tubular members against the conical or beveled surfaces. As a result, an inner annular surface of the gasket defining the opening is moved somewhat radially outward of the inner surfaces of the tubular members. Therefore, a crevice is formed in the flow passage defined by the tubular members, and, although the resulting dead volume is minimal, the desired zero dead volume condition is not achieved. As a result, there is some possibility for fine particles to accumulate in the crevice and later break off and discharge into a very clean environment, such as a dust-free room in which semiconductor materials are manufactured or assembled.

By some embodiments of the present invention, in order to provide a fitting with zero dead volume when the fitting is assembled and tightened, the gasket is provided with a central opening which has a slightly smaller diameter than the diameter of the inner surfaces of the tubular members which define the flow passage. The smaller diameter is chosen such that, when the fitting is tightened to an optimum point for making a seal, the inner surface of the gasket defining the opening is flush with the inner surfaces of the tubular members defining the flow passage. Consequently, there are no crevices for the accumulation of particles when the fitting is assembled and tightened and, therefore, zero dead volume is provided for the fitting in its fully tightened condition.

In co-pending application Ser. No. 07/694,066, a fitting is disclosed in which the wider outer ring serves as a spacer which engages the radial sidewalls of the tubular members and limits axial movement of the sealing beads with respect to the gasket after a seal is formed. The dimensions of the gasket are designed so that the dimension of the beveled regions in the axial direction is slightly less than the distance the annular sealing beads extend from the radial end walls of the tubular member. The radial length of the beveled region is approximately equal to the radius of the sealing bead. This fitting allows the metal of the gasket and the sealing beads which form the seal to deform within its elastic limits while preventing, by the engagement of the outer section of the gasket with the radial end walls of the tubular members, excess axial movement of the tubular members after a seal is achieved. Such a gasket prevents overtightening of the fittings and increases the number of times seals can be made, broken and remade with the components of the fitting. The overtightening prevention feature can be employed with a gasket having a slightly smaller diameter than the diameter of the inner surfaces of the tubular members. In that case, the outer section of the gasket prevents the fitting from being tightened beyond a point at which an optimal seal is formed and the inner diameter of the gasket is made equal to the inner diameter of the tubular members.

DETAILED DESCRIPTION OF THE PREFERRED EMBODIMENTS

Figure 1:
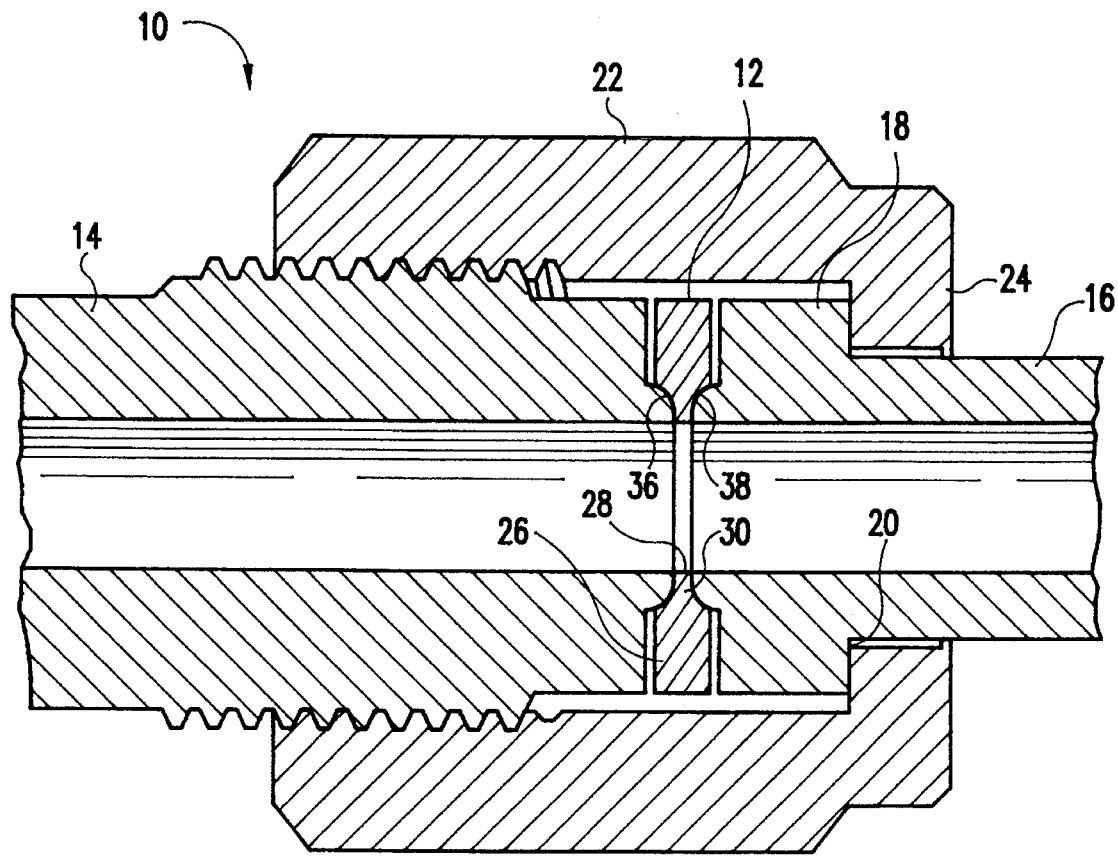
FIG. 1 is an axial cross section of a first embodiment of a fitting according to the present invention in a fully tightened condition.

As can be seen from FIG. 1, a first embodiment of a fitting according to the present invention, which is designated generally by the reference numeral 10, includes an annular gasket 12, a threaded gland 14 connected to a first conduit (not shown), a gland 16 having a radial flange 18 defining a shoulder 20, the gland 16 being connected to a second conduit (not shown), and a nut 22 threadedly engaging the threaded gland 14 and having a radially inwardly directed lip 24 engaging the shoulder 20 of the gland 16.

The gasket 12, which is made of stainless steel, nickel or other metallic substance, has an outer circular section 26 and a central circular section 28 having a reduced axial dimension. Between the circular sections 26 and 28 is a tapered section 30 having conical, or bevel, faces 32 and 34 on each axial side thereof, as can be seen from FIG. 2. The conical faces 32 and 34 are concentric about the axis of the gasket 12 and are inclined at angles of about 43 degrees to the axis.

The gasket 12 is preferably manufactured by forming a central aperture in a metal disk, coining the disk to form the tapered section 30 and the central circular section 28. If desired, the inner edge can then be machined to a uniform inner diameter. When the gasket material is of a type which is work hardened by the coining process, the gasket 12 should be annealed after the coining process to soften the material in order to insure that the gasket will make a good seal. Other methods of forming the gasket 12 may be employed, such as machining instead of coining.

Figure 2:
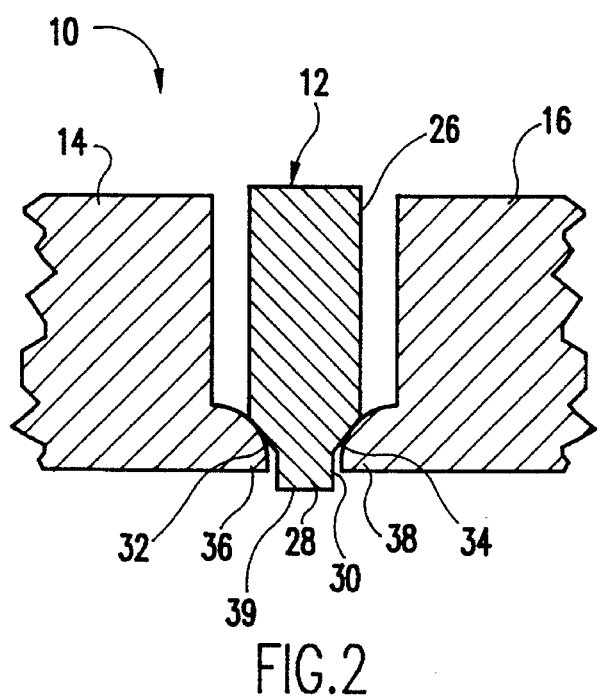
FIG. 2 is an enlarged fragmentary axial cross section of a portion of the fitting of FIG. 1 in a finger-tight condition.

The gasket 12 is engaged on opposite sides, on the conical faces 32 and 34, by annular noses or beads 36 and 38 defined on the glands 14 and 16, respectively. As the nut 22 is screwed on the threaded gland 14, the nut 22 pulls the annular noses 36 and 38 into engagement with the conical surfaces 32 and 34 of the gasket 12. The conical shape of the faces 32 and 34 serves to automatically align the noses 36 and 38 with the gasket 12 and with each other as the noses 36 and 38 are forced into tighter engagement with the conical faces 32 and 34. As is shown in FIG. 2, the noses 36 and 38 each have, in axial cross section, a rounded outer profile which is shaped and positioned to first contact the conical faces 32 and 34 of the gasket 12. Upon further tightening, the conical faces 32 and 34 deform to allow the rounded outer profiles of the noses 36 and 38 to move closer to one another and thereby engage the central circular section 28. Thus, sealing will occur principally along two annular lines between each nose 36 and 38 and its respective side of the annular gasket 12: a first high-pressure line where each nose 36, 38 engages its adjacent conical face 32, 34, and a second line where each nose engages the adjacent side of the central circular section 28. Sealing forces between the noses 36 and 38 and the sealing gasket 12 at the junctures of the central circular section 28 with the conical faces 32 and 34 are less than along the previously described annular lines. In fact, although FIG. 1 shows a condition in which there is continuous engagement between the noses 36 and 38 and the adjacent portions of the sealing gasket 12, there can also be conditions in which the tightened fitting has gaps between the noses 36 and 38 and the gasket 12 at the junctures of the central circular section 28 with the conical faces 32 and 34.

The portions of the noses 36 and 38 which project axially the farthest from the glands 14 and 16 lie on inner surfaces of the glands which define the flowpath for the fluids. As can be seen from FIG. 2, before the fitting 10 is in a fully tightened condition, an inner annular surface 39 of the central circular section 28, which defines the central opening in the gasket 12, is smaller than the diameter of the flow passage defined by the inner surfaces of the glands 14 and 16. Engagement of the noses 36 and 38 with the conical surfaces 32 and 34 and further tightening of the fitting 10 imposes forces on the gasket 12 in a radially outward direction. The noses 36 and 38 penetrate the conical surfaces 32 and 34, deforming the conical surfaces. As a result, the central circular section 28 is expanded radially outward, and the diameter of the inner annular surface 39 is increased. It is believed that the noses 36 and 38, by engaging the conical surfaces 32 and 34, push the material of the gasket 12 radially outward before any portion of the noses contacts the central circular section 28. It is also believed that when the noses contact the central circular portion 28, the radially outward expansion is slowed but not stopped.

The diameter of the inner annular surface 39 in its relaxed state is chosen such that tightening of the fitting 10 to its optimum sealing condition results in enlargement of the diameter of the inner annular surface 39 to equal the diameter of the fluid passageway through the glands 14 and 16, as shown in FIG. 1. This causes the inner annular surface 39 to be flush with the inner surfaces of the glands 14 and 16 and establishes a zero dead volume condition when the fitting is tightened to its optimum sealing condition. For example, for glands 14 and 16 having an inner diameter of 0.250 inches, a gasket 12 having an inner annular surface 39 with a diameter of 0.246 inches in its relaxed condition is used. When the fitting 10 is tightened to its optimal sealing condition, the diameter of the inner annular surface 39 is increased to 0.250 inches, and the inner annular surface is flush with the inner surfaces of the glands 14 and 16. For glands 14 and 16 having an inner diameter of 0.500 inches, a gasket 12 having an inner annular surface 39 with a diameter of 0.496 inches is used. When the fitting is tightened, the diameter of the inner annular surface is increased to 0.500 inches and made flush with the inner surfaces of the glands 14 and 16. Thus, for both mentioned gasket sizes, the diameter of the inner annular surface 39 increases 0.004 inches. It is to be noted that tightening of the fitting 10 beyond its optimal sealing condition causes the diameter of the inner annular surface 39 to decrease.

The axially farthest projecting portions of the noses 36 and 38 have an inner diameter which is the same as the inner annular surface 39 of the gasket 12. By this structure, no portion of the noses 36 and 38 extends into the flow path defined by the conduits and the glands 14 and 16, and the radially innermost portions of the noses 36 and 38 engage the central circular section 28 of the gasket 12 so that there are no spaces or crevices between the glands 14 and 16 and the gasket 12. The noses 36 and 38 have an axial cross section of a sector of a circle, for example, one-quarter of a circle, in which a radius defining each sector lies along the inner surface of the glands 14 and 16, as can be seen from FIGS. 1 and 2. The sector includes a rounded outer profile (a quarter of a circumference) and a rectilinear inner profile (the radius). Thus, a joint having substantially no dead volume, or minimum dead volume, along the inner diameter of the fitting 10 is achieved. The combination of curved outer profile and rectilinear inner profile defines a shape which exerts even greater pressure against the gasket than does the semicircular cross section of the noses of U.S. Pat. No. 4,854,597 to Leigh.

The inner section 28 of the gasket 12 serves as a place for material flow during the coining operation of forming the conical faces. Any material which might flow inside the inner diameter of the gasket 12 is removed by the machining, if the machining step is performed. The inner section 28 provides a stop for the noses 36 and 38. As can be seen from the enlarged cross section of FIG. 2, which shows the fitting according to the present invention in a finger-tight condition, when the noses 36 and 38 of the glands 14 and 16 are brought into engagement with the gasket 12, they make contact with the conical faces 32 and 34. In order to achieve a sealing contact, as shown in FIG. 1, the nut 22 is turned about ⅓ turn past the finger-tight condition. This tightening causes the conical surfaces 32 and 34 to be deformed, allowing the noses 36 and 38 to engage the central circular section 28. It also causes the inner annular surface 39 to expand to a diameter substantially equal to the diameter of the inner surfaces of the glands 14 and 16.

Figure 3:
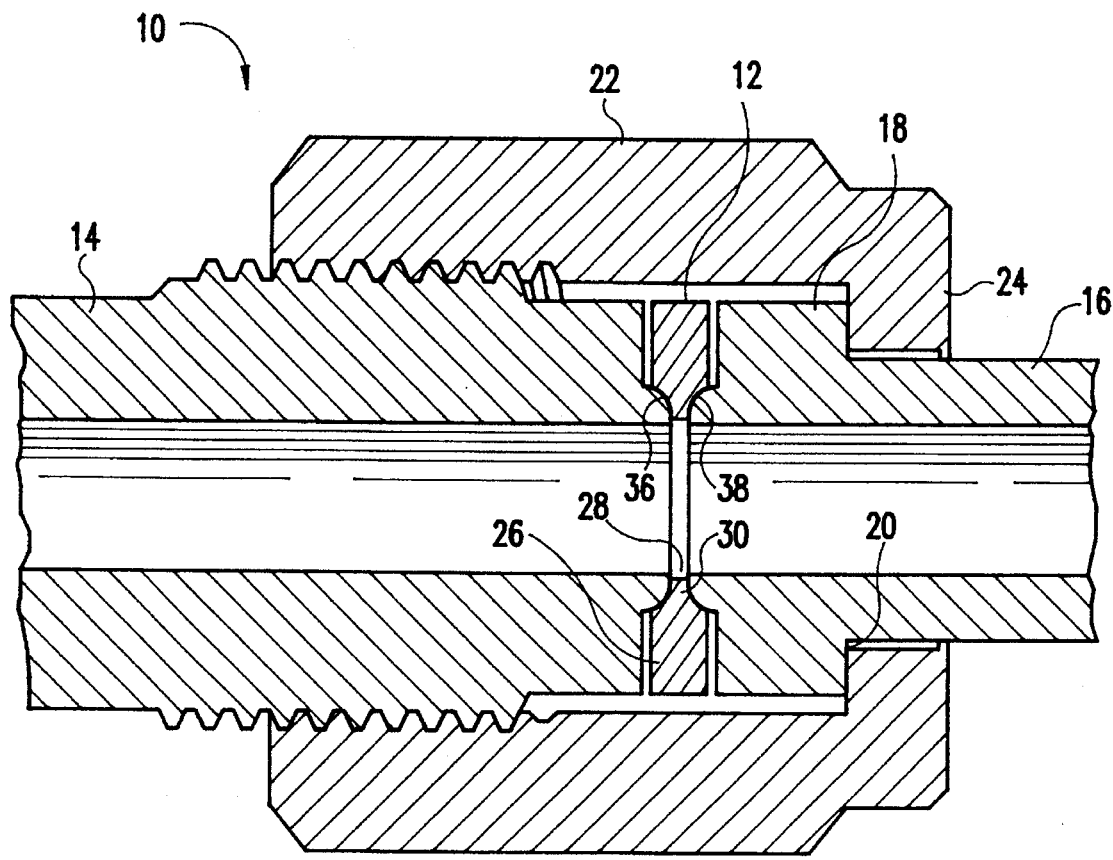
FIG. 3 is an axial cross section of a second embodiment of a fitting according to the present invention in a fully tightened condition.
Figure 4:
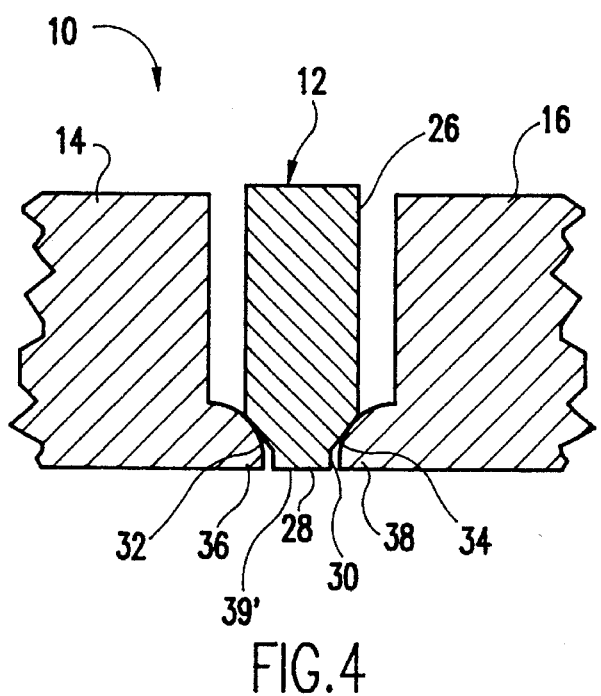
FIG. 4 is an enlarged fragmentary axial cross section of a portion of the fitting of FIG. 3 in a finger-tight condition.

As can be seen from FIGS. 3 and 4, a gasket 12 can be used which has an inner annular surface 39' equal to the inner diameter of the axially farthest projecting portions of the noses 36 and 38 when the gasket 12 is in its relaxed position. The inner annular surface 39' will be enlarged so that its diameter is slightly greater than, although still substantially equal to, the inner diameter of the axially farthest projecting portions of the noses 36 and 38 when the fitting 10 is fully tightened. More specifically, where the diameter of the inner annular surface 39' is either 0.250 inches or 0.500 inches in its relaxed condition, it increases by 0.004 inches when the fitting 10 is tightened. Thencefore, there will be some dead volume, unlike the embodiment illustrated in FIGS. 1 and 2 in which the inner annular surface 39 is initially smaller in diameter than the inner diameter of the axially farthest projecting portions of the noses 36 and 38, but is equal to their inner diameter when the fitting 10 is tightened to an optimal sealing condition. It is better for the inner diameter of the inner annular surface 39' to be slightly greater than the diameter of the axially farthest projecting portions when the gasket is in its fully tightened condition than it would be for the diameter of the inner annular surface 39' to be slightly smaller than the axially farthest projecting portions when the fitting is in its fully tightened position, and thereby project into the flowpath.

Figure 5:
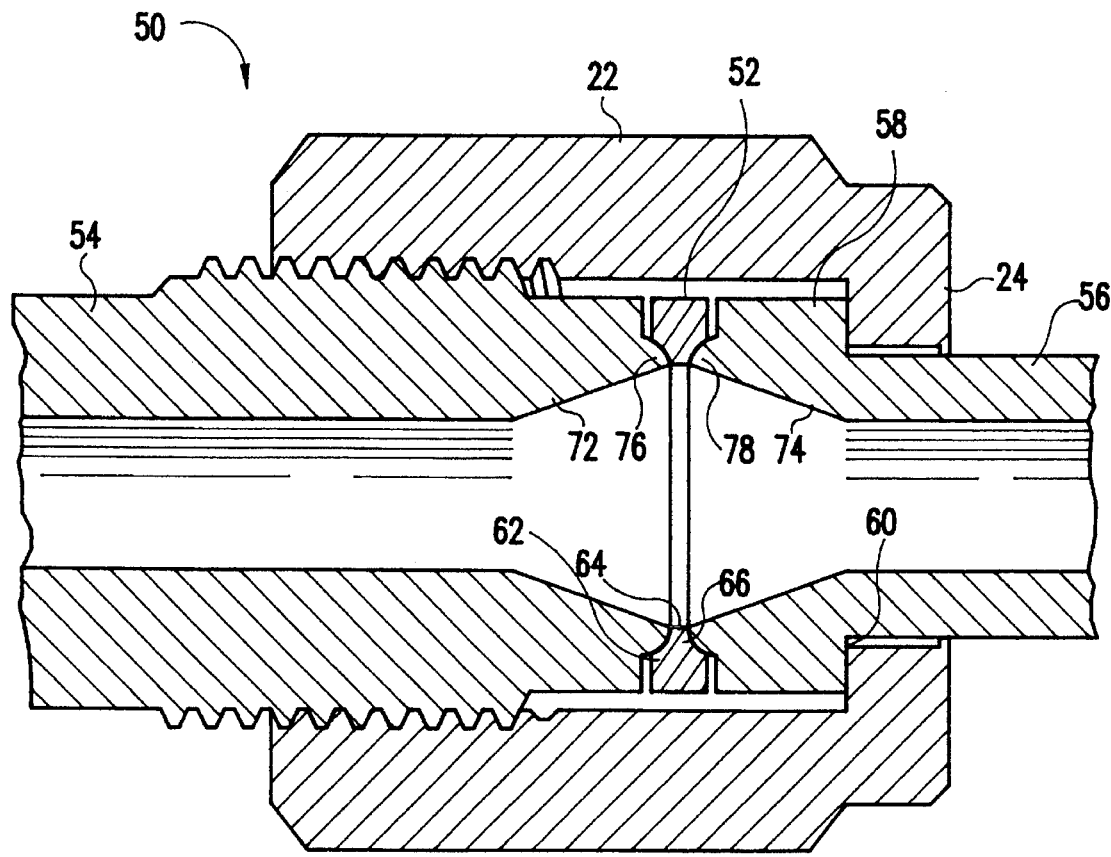
FIG. 5 is an axial cross sectional view of a third embodiment of a fitting according to the present invention in a fully tightened condition.
Figure 6:
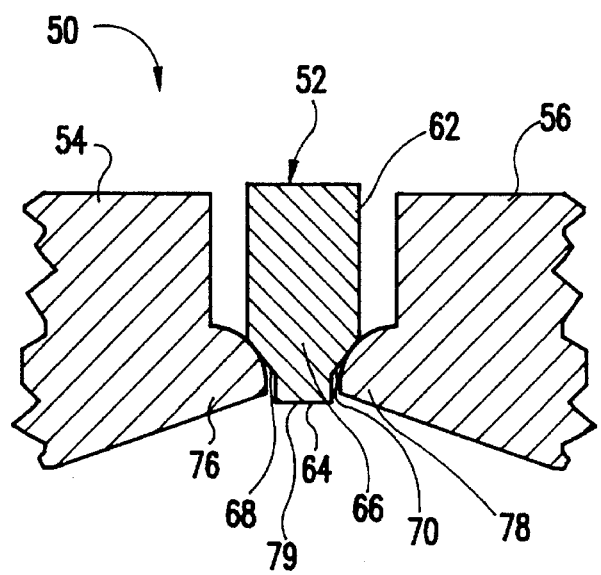
FIG. 6 is an enlarged fragmentary axial cross section of a portion of the fitting of FIG. 5 in a finger-tight condition.

The minimum dead volume fitting according to the present invention can take other forms, as can be seen from the embodiment of FIGS. 5 and 4. In this embodiment, the fitting, which is designated generally by the reference numeral 50, includes a gasket 52, a threaded gland 54, and a gland 56 having a radial flange 58 defining a shoulder 60. The gasket 52 has an outer circular section 62, a central circular section 64 having a reduced axial dimension, and a tapered section 66 between the circular sections 62 and 64, the tapered section 66 having conical faces 68 and 70 (FIG. 6). The nut 22 having the inwardly directed lip 24 from FIG. 1 can be used with the fitting of the embodiment illustrated in FIGS. 5 and 6. Flaring portions 72 and 74 are formed by machining an existing fitting in which noses 76 and 78 project from the glands 54 and 56 in an annulus. By machining the flaring portions 72 and 74 to the point where the widest parts of the flaring portions coincide with the portions of the noses 76 and 78 projecting the farthest from the glands 54 and 56, the farthest portions of the noses lie along the flow passage. Thus, crevices for collecting dirt are avoided.

Due to the flaring portions 72 and 74, the glands 54 and 56 have a larger inner diameter in the regions of their engagement with the gasket 52. The gasket 52 has an inner annular surface 79 having a diameter equal to the inner diameter of the portions of the noses 76 and 78 extending axially farthest from the glands 54 and 56. Thus, the gasket 52 has a larger inner diameter and a smaller radial dimension between the inner diameter and outer diameter than does a corresponding gasket 12 from the embodiment of FIGS. 1 and 2. For example, for glands 54 and 56 having an inner diameter of 0.250 inches in the unflared portions, the portions of the noses 76 and 78 extending axially farthest from the glands have an inner diameter of 0.312 inches and an inner annular surface 79 of the gasket 52 can have a diameter in its relaxed condition of 0.304 inches and an inner diameter in its optimally tightened condition of 0.312 inches, equal to the largest inner diameter of the flaring portions 72 and 74. Where the glands 54 and 56 have an inner diameter of 0.500 inches in the unflared portions, the portions of the noses 76 and 78 extending axially farthest from the glands have an inner diameter of 0.610 inches and the inner annular surface 79 of the gasket 52 can have a diameter in its relaxed condition of 0.602 inches and an inner diameter in its optimally tightened condition of 0.610 inches, equal to the largest inner diameter of the flaring portions 72 and 74. Thus, for both mentioned gasket sizes, the diameter of the inner annular surface increases 0.008 inches upon tightening. Tightening the fitting 50 beyond its optimal sealing condition causes the diameter of the inner annular surface 79 to decrease. The angle of the flaring portions 72 and 74 of the glands 14 and 16 results in the noses 76 and 78 having an axial cross section with a sector of a circle extending through less than one-quarter of a circle. An inner surface of each nose 76, 78 defining such a sector is an extension of an inner surface of one of the glands 54, 56. FIG. 6 shows an enlarged fragment of the fitting of FIG. 5 in its finger-tight condition, the fully tightened condition of FIG. 5 resulting from tightening the fitting about ⅓ of a turn from the position shown in FIG. 6. The principal sealing along two annular lines is essentially the same for the embodiment of FIGS. 5 and 6 as was described for the embodiment of FIGS. 1 and 2, and both embodiments operate in the same manner.

Figure 7:
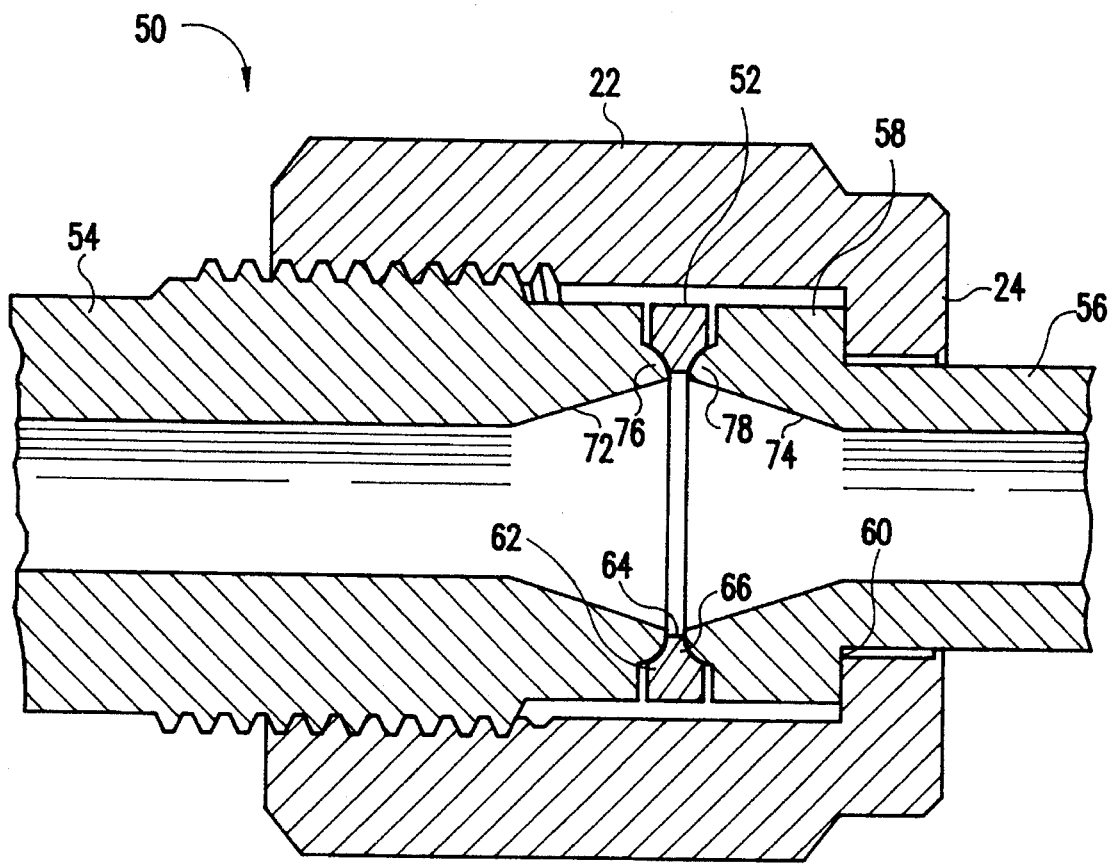
FIG. 7 is an axial cross sectional view of a fourth embodiment of a fitting according to the present invention in a fully tightened condition.
Figure 8:
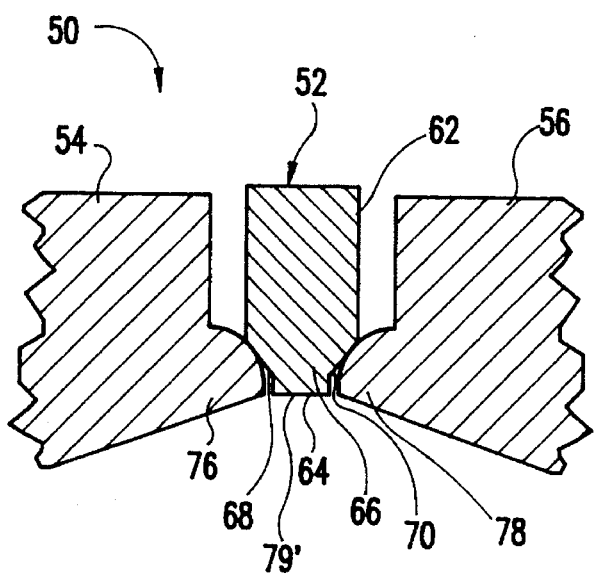
FIG. 8 is an enlarged fragmentary axial cross section of a portion of the fitting of FIG. 7 in a finger-tight condition.

As with the embodiment of FIGS. 1 and 2, the inner annular surface 79' of the gasket 52 can be equal to the inner diameter of the axially farthest extending portions of the noses 76 and 78 when the gasket 52 is in its relaxed condition, as can be seen from FIGS. 7 and 8. However, the inner annular surface 79' will be enlarged somewhat when the fitting 50 is tightened to its optimal sealing condition and, thus, there will be some, although minimum, dead volume in such an arrangement, unlike the embodiment illustrated in FIGS. 5 and 6. In this embodiment, where the diameter of inner annular surface 79' is initially 0.312 inches or 0.610 inches, it increases by only 0.008 inches upon tightening and, thus, is still substantially equal to the inner diameter of the axially farthest extending portions of the noses 76 and 78.

Figure 9:
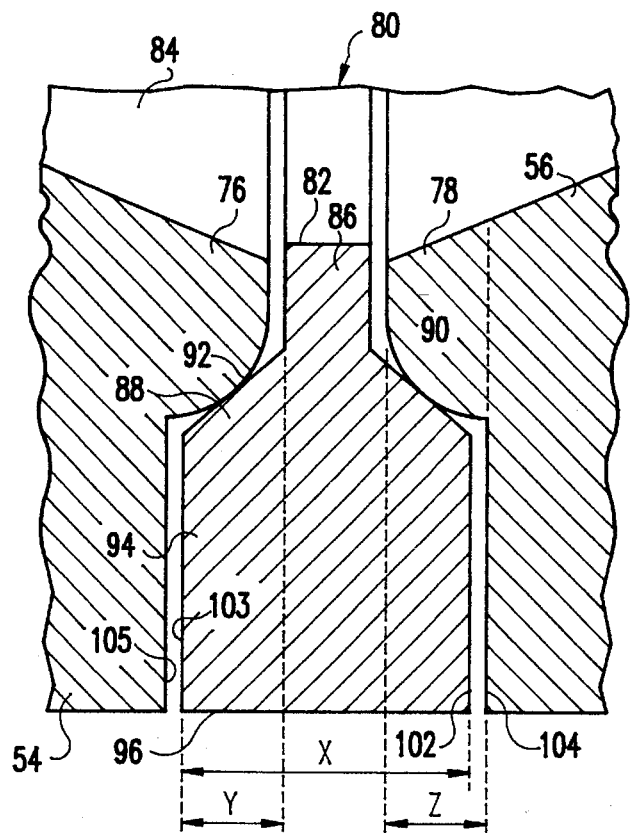
FIG. 9 is an axial cross section of a fifth embodiment of a fitting according to the present invention in a finger-tight condition.

As can be seen from FIG. 9, a fifth embodiment according to the present invention includes a gasket, generally designated by the reference numeral 80, which prevents overtightening of the fitting and limits the tightening of the fitting to an optimal sealing condition. In the optimal sealing condition, the diameter of an inner annular surface 82 of the gasket 80 is substantially equal to the inner diameter of the surfaces of the glands or tubular members 54 and 56 brought together to comprise the fitting. Except for the presence of the gasket 80, the fitting according to the third embodiment is substantially the same as the fitting 50 according to the second embodiment, which is illustrated in FIGS. 5 and 6.

Figure 10:
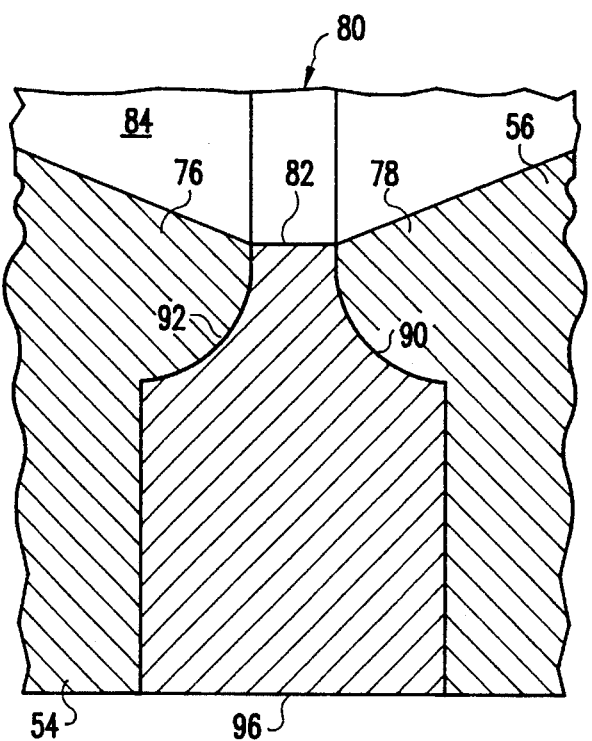
FIG. 10 is an axial cross section of the fitting of FIG. 9 in a fully-tightened condition.

The gasket 80 is designed to be employed between the tubular members 54 and 56, which have the annular sealing beads 76 and 78. The sealing beads 76, 78 have an arcuate outer profile which is a modification of conventional fittings having semi-circular annular sealing beads. In cross section, the inner profiles of the sealing beads 76 and 78 define the confines of a conduit 84, and the outer arcuate profile engages the gasket 80. There is zero dead volume because of the absence of any voids, or spaces, between the gasket 80 and the ends of the tubular members 76 and 78 at the surfaces of the tubular members defining the flow passage. As best shown in FIG. 10, the conduit 84 defined by the interior surfaces of the tubular members 54 and 56 and the inner annular surface 82 of the gasket 80 results in two conical surfaces meeting at the inner annular surface 82 of the gasket 80. The resulting conduit wall is a continuous streamlined surface promoting laminar flow and is only interrupted by the slight seams between the gasket 80 and the tubular members 54, 56.

As best shown in FIG. 9, the gasket 80 is an annular ring having three distinct sections. A narrow inner section 86, a middle section 88 having beveled faces 90 and 92, and a wide outer section 94. The beveled faces 90 and 92 engage the annular sealing beads 76 and 78 to effect a seal. The outer section 94 serves as a spacer which limits the pressure that can be exerted on the sealing surfaces. The inner annular surface 82, which defines the flow passage, and an exterior surface 96 of the gasket 80 are both cylindrical. FIG. 9 shows the fifth embodiment of the invention at the point at which the sealing beads 36 and 38 first contact the beveled faces 90 and 92 of the gasket, before full tightening. FIG. 10 shows the fifth embodiment after full tightening and after sealing has been satisfactorily achieved.

As with the first and third embodiments, the inner annular surface 82 of the gasket 80 of the fifth embodiment has a diameter in its relaxed condition which is smaller than the diameter of the inner profile of the noses 76 and 78 at their farthest axial projection beyond the radial end walls of the glands 54, 56. In addition, when the fitting according to the fifth embodiment is fully tightened, the diameter of the inner annular surface 82 is enlarged by the tightening to achieve a diameter substantially equal to the diameter of the farthest axially extending portions of the inner profiles of the noses 76, 78. In the fifth embodiment, the diameter of the inner annular surface 82 in its relaxed condition is chosen so that it attains the aforesaid enlarged diameter at the point where the outer section 94 of the gasket 80 prevents further tightening of the fitting. This is also the point where the optimal sealing condition for the fitting is achieved.

With respect to the overtightening prevention feature, the tubular members 54 and 56 are drawn together, such as by the arrangement of the coupling nut 22 of FIGS. 1 and 3. As the tubular members 54 and 56 are drawn together, gasket 80 is sandwiched between the ends of the tubular members 54 and 56, and the annular sealing beads 76 and 78, which project from the ends of the tubular members 54 and 56, respectively, engage the beveled faces 90 and 92 of gasket 80. Continued rotation ok the coupling nut draws the tubular members 54 and 56 closer together and causes the pressure on the components of the fitting to increase. The metal which makes up the sealing beads 76 and 78 and the gasket 80 is slightly malleable, which facilitates the formation of an helium-tight seal.

As best shown in FIG. 9, as each sealing bead 76, 78 engages the respective beveled face 90, 92 of the gasket 80, it exerts a force on the gasket having both an axial component and a radial component. Because the faces 90, 92 are beveled, the radial force components tend to push the gasket 80 radially outward. The radial force also enlarges the diameter of the inner annular surface 82 of the gasket 80 to a diameter equal to the largest diameter of the inner surfaces of the tubular members 54 and 56 defining the flow passage. The diameter of the inner annular surface 82 in its relaxed condition is chosen such that the diameter in an expanded condition is equal to the largest diameter of the inner surfaces of the tubular members 54 and 56 when further tightening of the coupling is prevented. The radial force also ensures an even distribution of pressure around the entire seal. A reactive force tends to force the sealing beads 76, 78 radially inward towards the flow passage formed by the tubular members 54, 56. As the sealing beads 76, 78 and the beveled faces 90, 92 come together, the surfaces of these components which make up the seal tend to slightly deform as a consequence of the pressure exerted at the point of the seal, as is shown in exaggeration in FIG. 10. Slight deformation is required to achieve the seal and is advantageous because, upon deformation, the metal of the components fills any void spaces. Upon disassembly, the beads 76, 78 return to their unstressed shapes, because the elastic limit of the metal of which they are made is not exceeded when the fitting is in the fully tightened condition.

After formation of the seal, the radial sidewalls 102, 103 of the outer section 94 of the gasket 80 engage the radial end walls 104, 105 of the tubular elements 54, 56. When these flat surfaces meet, further axial movement of the tubular members 54 and 56 with respect to the gasket 80 is prevented, and deformation beyond the elastic limits of the sealing beads 76 and 78 is prevented. The assembler can easily sense the point when the two flat surfaces meet because the resistance on the coupling nut 22 quickly and severely increases.

In order for the fitting to function efficiently, the gasket 80 is constructed with precise dimensions with respect to the annular sealing beads 76, 78 on the tubular members 54, 56.

As shown in FIG. 9, the axial distance X between the radial sidewalls 102,103 of the outer section 94 of the gasket 80 is constant, and the radial faces of the outer section are planar and perpendicular to an axis through the conduit. The inner circumference of the outer section 94 is equal to or greater than the outer circumference of the annular sealing beads 76, 78. The middle beveled section 88, which extends inwardly and axially, meets the inner section 86, which has a narrower and uniform axial dimension. The inner section 86, like the outer section 94, has radial sidewalls perpendicular to an axis through the conduit. The axial distance Y between each of the radial sidewalls of the inner section 86 and the adjacent radial sidewall 102, 103 of the outer section 94 is slightly less than the distance Z by which the sealing beads 76, 78 extend axially from the radial end walls 102ƒ 103 of the tubular elements 54, 56. When the sidewalls 102, 103 of the gasket's radial outer section 94 meet the end walls 104, 105 of the tubular members 54, 56, further axial movement bringing the components together is prevented.

Figure 11:
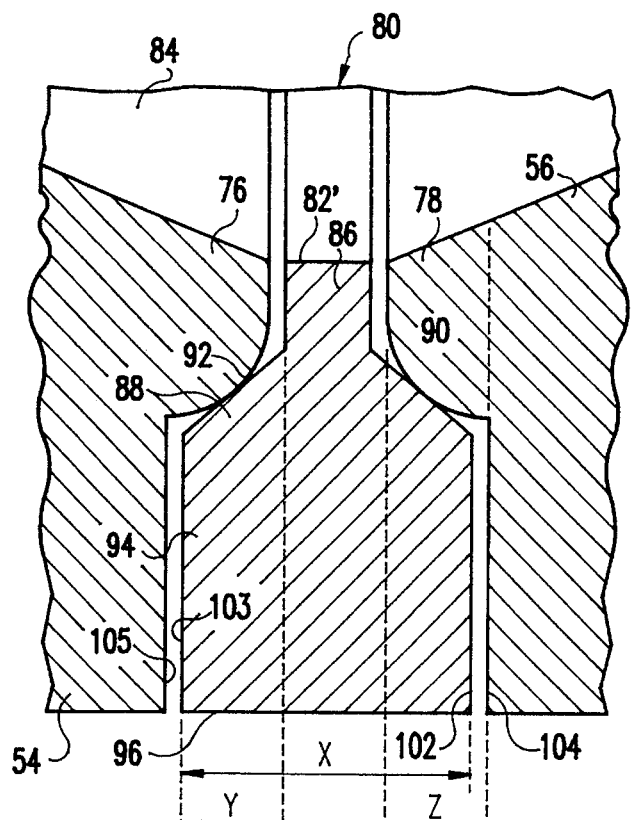
FIG. 11 is an axial cross section of a sixth embodiment of a fitting according to the present invention in a finger-tight condition.
Figure 12:
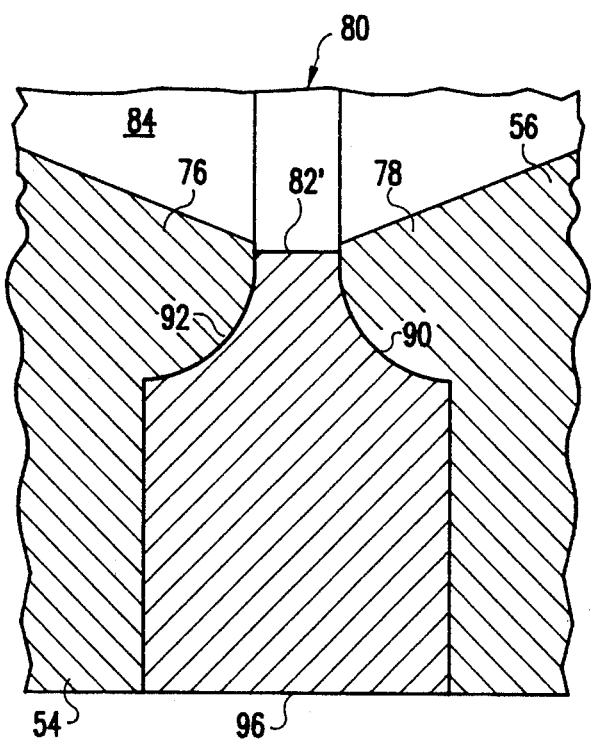
FIG. 12 is an axial cross section of the fitting of FIG. 11 in a fully-tightened condition.

As with the first and third embodiments, the embodiment of FIGS. 9 and 10 can be modified so that the diameter of the inner annular surface 82' of the gasket 80 is equal in its relaxed condition to the inner diameter of the axially farthest projecting portions of the sealing beads 76 and 78, as can be seen from FIGS. 11 and 12. The inner annular surface 82' will be enlarged slightly upon tightening of the fitting and, thus, will form a slight, but minimum, dead volume in the flow passage, as was discussed in connection with the other embodiments in which the diameter of the inner annular surface, in the relaxed condition of the gasket, equals the inner diameter of the axially farthest extending portions of the annular end formations. When the diameter of the inner annular surface 82' is initially 0.312 inches or 0.610 inches, it increases by 0.008 inches upon tightening.

Figure 13:
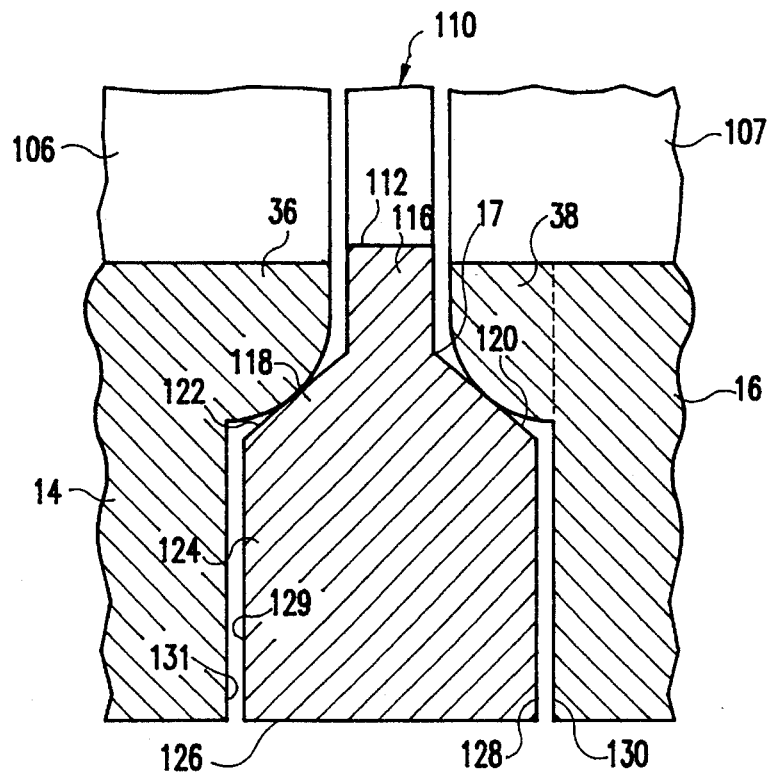
FIG. 13 is an axial cross section of a seventh embodiment of a fitting according to the invention before a seal is achieved.
Figure 14:
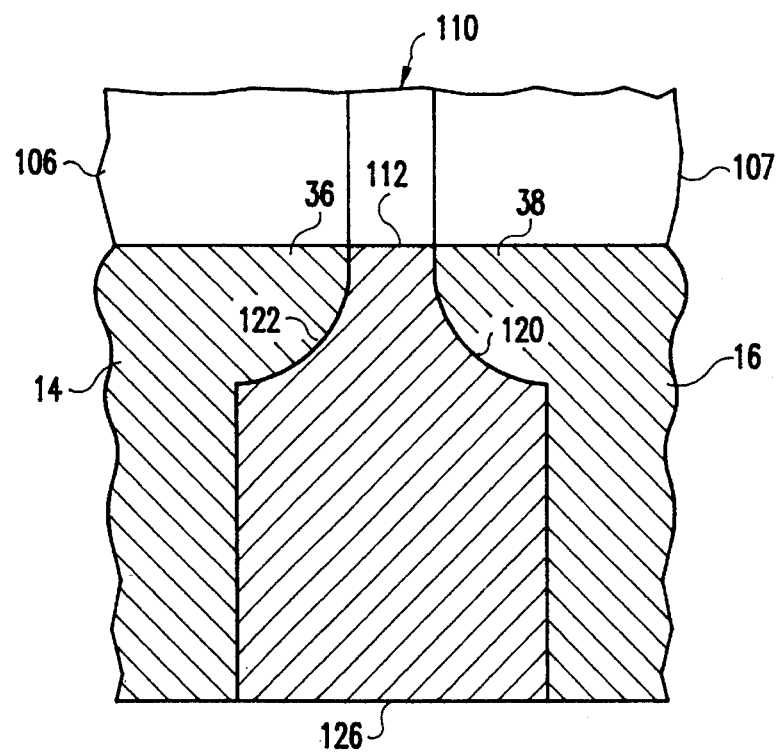
FIG. 14 is an axial cross section of the fitting of FIG. 13 in a fully-tightened condition.

FIGS. 13 and 14 show a seventh embodiment of the invention before and after a seal is achieved. In this embodiment, also an overtightening preventing embodiment, the interior surfaces 106 and 107 of the tubular members 14 and 16 are in axial alignment, and the circumference of the conduit formed by a gasket 110 and the tubular members is equal throughout the fitting. When the components are tightened as shown in FIG. 14, the flow passage is defined by a substantially continuous cylindrical surface.

The gasket 110 prevents overtightening of the fitting and limits the tightening of the fitting to an optimal sealing condition. In the optimal sealing condition, the diameter of an inner angular surface 112 of the gasket 110 is substantially equal to the inner diameter of the surfaces 106, 107 of the glands 14, 16 brought together to comprise the fitting. Except for the presence of the overtightening prevention gasket 110, the fitting according to the fourth embodiment is substantially the same as the fitting 10 according to the first embodiment, which is illustrated in FIGS. 1 and 2.

The gasket 110 is designed to be employed between the glands 14 and 16, which have the annular sealing beads 36 and 38. As best shown in FIG. 13, the gasket 110 is an annular ring having three distinct sections. A narrow inner section 116, a middle section 118 having beveled faces 120 and 122, and a wide outer section 124. The beveled faces 120 and 122 engage the annular sealing beads 36 and 38 to effect a seal. The outer section 124 serves as a spacer which limits the pressure that can be exerted on the sealing surfaces. The inner annular surface 112, which defines the flow passage, and an exterior surface 126 of the gasket 110 are both cylindrical. FIG. 13 shows the seventh embodiment of the invention at the point at which the sealing beads 36 and 38 first contact the beveled faces 120 and 122 of the gasket, before full tightening. FIG. 14 shows the seventh embodiment after full tightening and after a seal has been satisfactorily achieved.

As with the other illustrated embodiments, the inner annular surface 112 of the gasket 110 of the seventh embodiment has a diameter in its relaxed condition which is smaller than the diameter of the inner profile of the noses 36 and 38 at their farthest axial projection beyond the radial end walls of the glands 14, 16. In addition, when the fitting according to the fourth embodiment is fully tightened, the diameter of the inner annular surface 112 is enlarged by the tightening to achieve a diameter substantially equal to the diameter of the farthest axially extending portions of the inner profiles of the noses 36, 38. The diameter of the inner annular surface 112 in its relaxed condition is chosen so that it attains the aforesaid enlarged diameter at the point where the outer section 124 of the gasket 110 prevents further tightening of the fitting. This is also the point where the optimal sealing condition for the fitting is achieved.

The seventh embodiment operates in the same manner as the fifth embodiment. There is a difference in structure between the two embodiments in that, in the fifth embodiment, an overtightening preventing gasket is used in connection with tubular members in which the flow passage is flared outwardly at the ends of the members, whereas, in the seventh embodiment, the flow passage is cylindrical at the ends of the tubular members.

Figure 15:
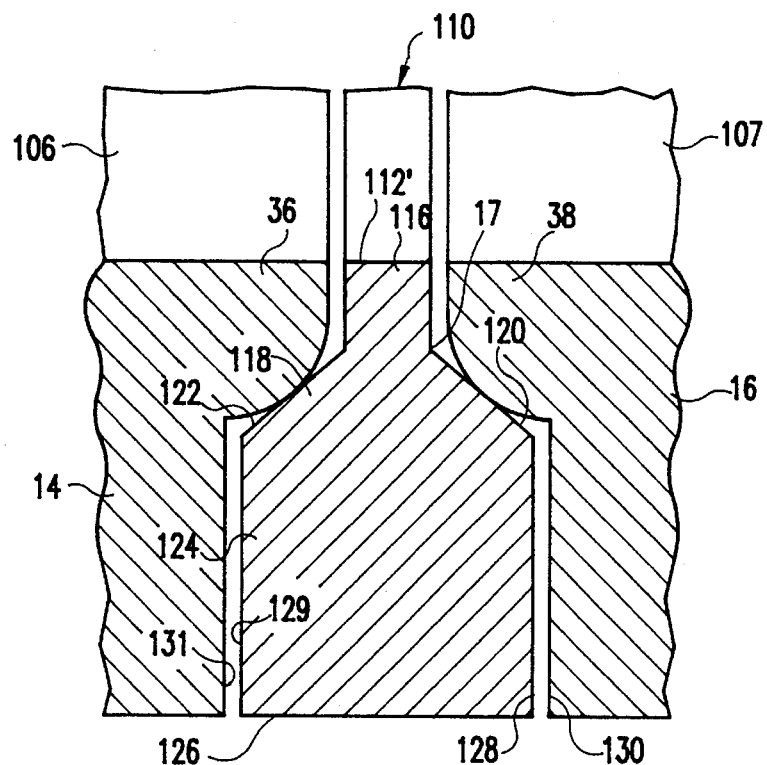
FIG. 15 is an axial cross section of a eighth embodiment of a fitting according to the invention before a seal is achieved.
Figure 16:
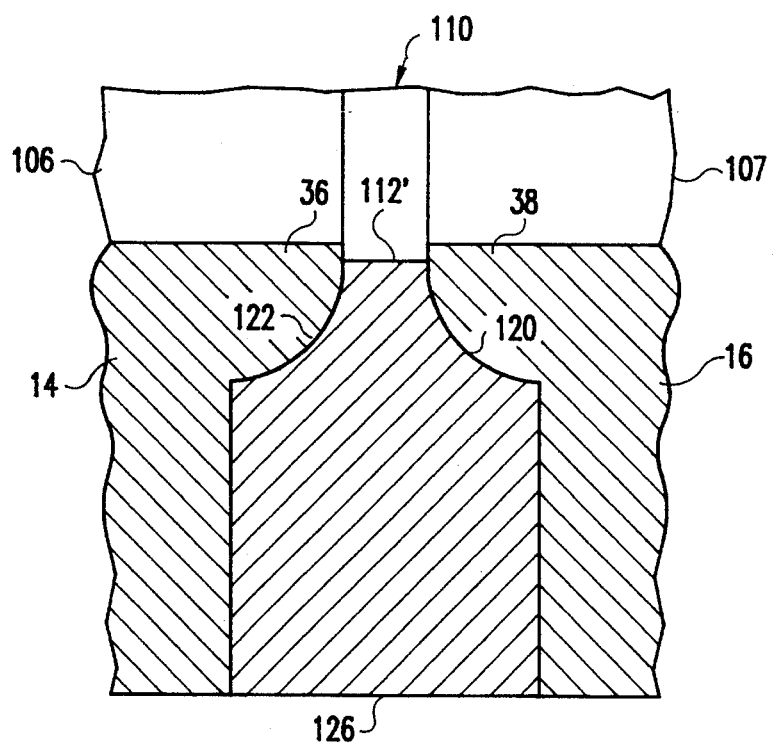
FIG. 16 is an axial cross section of the fitting of FIG. 15 in a fully-tightened condition.

As with the previously-described embodiments, the inner annular surface 112' of the gasket 110 of the seventh embodiment can be made equal to the inner diameter of the axially farthest extending portions of the annular sealing beads 36 and 38, when the gasket 110 is in its relaxed condition, as can be seen from FIGS. 15 and 16. However, due to enlargement of the inner annular surface 112' when the fitting is tightened, a slight dead volume will be formed. When the diameter of the inner annular surface 112' is initially 0.250 inches or 0.500 inches, it increases by 0.004 inches upon tightening.

The foregoing description of preferred embodiments of the present invention is considered illustrative rather than limiting. It is contemplated that various modifications can be made without departing from the spirit and scope of the present invention, which is defined in the appended claims.

I claim:

1. A face seal fitting, comprising:

a first tubular element having an end face, an inner surface defining a flowpath and a first annular end formation projecting axially from the end face of said first tubular element;

a second tubular element having an end face, an inner surface further defining said flowpath and a second annular end formation projecting axially from the end face of said second tubular element; and a metal gasket including
an inner section in the form of an annulus having an axis, and
a tapered section extending radially outward from said inner section, said tapered section defining two bevel faces directed away from one another and inwardly toward the axis of said annulus, wherein said first annular end formation engages one of said bevel faces in a first region, said second annular end formation engages the other of said bevel faces in a second region, said first and second annular end formations have portions extending axially the farthest from the end faces of said first and second tubular elements, each said farthest extending portion lies on the inner surface of its associated tubular element and has an inner diameter, and said gasket has an inner diameter substantially equal to the inner diameters of said farthest extending portions, whereby dead volumes along the flowpath through said fitting are minimized.

2. The face seal fitting according to claim 1, wherein said first and second annular end formations each has a profile in axial section defining an arc intersected by a straight line lying along the inner surface of its associated tubular element, the intersection of said line and said arc being at said farthest point.

3. The face seal fitting according to claim 2, wherein the inner surfaces of said first and second tubular elements are cylindrical adjacent to said annular end formations.

4. The face seal fitting according to claim 2, wherein the inner surfaces of said first and second tubular elements have flaring portions extending to said portions of said first and second annular end formations which extend axially the farthest from the end faces of said first and second tubular elements.

5. The face seal fitting according to claim 1, wherein said metal gasket further includes an outer section in the form of an annulus having a first axial dimension, said inner section is concentric with the annulus of said outer section and has a second axial dimension shorter than said first axial dimension, and said tapered section connects said outer section with said inner section.

6. The face seal fitting according to claim 1, wherein said face seal fitting has an optimal sealing condition in which said gasket is clamped between said first and second tubular elements, and said gasket, in a relaxed condition, has an inner diameter smaller than the inner diameter of said farthest extending portions of said first and second annular end formations, said face seal fitting being movable between a first position, in which a non-sealing condition exists and said gasket is in its relaxed condition, and a second position, in which a sealing condition exists and said inner diameter of said gasket is equal to the inner diameter of said farthest extending portions of said first and second annular end formations.

7. The face seal fitting according to claim 6, wherein each of said first and second annular end formations has a profile in axial section defining an arc intersected by a straight line lying along the inner surface of its associated tubular element, the intersection of said line and said arc being said farthest extending portion.

8. The face seal fitting according to claim 6, wherein the inner surfaces of said first and second tubular elements are cylindrical adjacent to said annular end formations.

9. The face seal fitting according to claim 8, wherein the inner surfaces of said first and second tubular elements have flaring portions adjacent to said annular end formations.

10. The face seal fitting according to claim 6, further comprising means for holding said tubular elements in sealing engagement with said gasket.

11. The face seal fitting according to claim 6, wherein said gasket further includes an outer section in the form of an annulus having a first axial dimension, said inner section is concentric with the annulus of said outer section and has a second axial dimension shorter than said first axial dimension, and said tapered section connects said outer section with said inner section.

12. The face seal fitting according to claim 6, further comprising means for preventing movement of said face seal fitting beyond said second position.

13. The face seal fitting according to claim 12, wherein said movement preventing means comprises an outer section in said gasket, said outer section being interposed between said first and second tubular elements.

14. The face seal fitting according to claim 13, wherein said outer section is interposed between the end faces of said first and second tubular elements.

15. The face seal fitting according to claim 11, wherein said first and second annular end formations are in axial alignment with said inner section of said gasket and said tapered section of said gasket.

16. The face seal fitting according to claim 15, wherein said inner section and said outer section define side faces facing toward said first and second tubular elements, and the distance by which the first and second annular end formations project axially from their end faces is greater than the distance between each side face of the inner section of the gasket and the adjacent side face of the outer section of the gasket.

17. The face seal fitting according to claim 1, wherein said face seal fitting has an optimal sealing condition in which said gasket is clamped between said first and second tubular elements, and said gasket, in a relaxed condition, has an inner diameter equal to the inner diameter of said farthest extending portions of said first and second annular end formations, said face seal fitting being movable between a first position, in which a non-sealing condition exists and said gasket is in its relaxed condition, and a second position, in which a sealing condition exists.

18. A face seal fitting comprising a first conduit having an inner surface defining the outer boundary of a flowpath and having a radial end face having an annular nose projecting from said end face, a second conduit having an inner surface defining the outer boundary of a flowpath and a radial end face having an annular nose projecting from said end face, a metal gasket sandwiched between said end faces and making a sealing engagement with said noses, said gasket having an inner cylindrical surface having substantially the same diameter as the inner surfaces of said first and second conduits where said conduits engage said gasket, means to hold said end faces together sandwiching said gasket therebetween with axial pressure applied to said gasket, said end faces with said noses and said gasket being shaped when fully engaged under axial pressure applied by said means to fit together so that no more than minimal dead spaces are defined between said gasket and said conduits at said inner surfaces and said inner surfaces define the outer boundary of a continuous flow path.

19. A face sealing fitting comprising a gasket and at least one tubular member, said tubular member having an inner diameter and an annular sealing bead projecting from a radial end wall of said tubular member, the annular sealing bead having, in axial cross section, a rounded outer profile shaped and positioned to engage said gasket to form a high pressure seal, and a rectilinear inner profile defining an open passageway within said tubular member adjacent to said gasket, whereby any dead volume in said fitting is minimized when a sealing condition exists in said fitting.

20. The face seal fitting according to claim 19, further comprising means for aligning said tubular element with said gasket.

21. A face sealing fitting comprising a gasket and at least one tubular member, said tubular member having an inner diameter and an annular sealing bead projecting from a radial end wall of said tubular member, the annular sealing bead having, in axial cross section, a rounded outer profile shaped and positioned to engage said gasket to form a high pressure seal, and a rectilinear inner profile defining an open passageway within said tubular member adjacent to said gasket, whereby any dead volume in said fitting is minimized when a sealing condition exists in said fitting, wherein said gasket has an inner beveled section defining an annular beveled surface facing toward an axis of said gasket, an outer section, and, in a relaxed condition, an inner diameter smaller than the inner diameter of said tubular member, said inner beveled surface being arranged to engage said sealing bead and form a seal, said rounded outer profile is arranged to engage said beveled surface, and said fitting is movable between a first position, in which a non-sealing condition exists and said gasket is in its relaxed condition, and a second position, in which a sealing condition exists and said inner diameter of said gasket is equal to said inner diameter of said tubular member.

22. The face seal fitting according to claim 21, wherein said outer section has an axial dimension which limits compression of said sealing bead beyond its elastic limits by engagement with said radial end wall.

23. A method of making a seal in a face seal fitting including

- a first tubular element having an end face, an inner surface defining a flowpath and a first annular end formation projecting axially from the end face of said first tubular element;
- a second tubular element having an end face, an inner surface further defining said flowpath and a second annular end formation projecting axially from the end face of said tubular element; and
- a metal gasket including
  - an inner section in the form of an annulus having an axis, and
  - a tapered section extending radially outward from said inner section, said tapered section defining two bevel faces directed away from one another and inwardly toward the axis of said annulus,
- wherein said first annular end formation engages one of said bevel faces in a first region, said second annular end formation engages the other of said bevel faces in a second region, said first and second annular end formations having portions extending axially the farthest from the end faces of said first and second tubular elements, each said farthest extending portion lies on the inner surface of its associated tubular element and has an inner diameter, the method comprising:
- engaging said bevel faces with said annular end formations; and
- tightening said annular end formations against said bevel faces to enlarge the inner diameter of said gasket to a diameter substantially equal to the inner diameter of said farthest extending portions of said first and second annular end formations.

* * * * *

UNITED STATES PATENT AND TRADEMARK OFFICE
CERTIFICATE OF CORRECTION

PATENT NO. : 5,505,464
DATED : April 9, 1996
INVENTOR(S) : RAYMOND C. McGARVEY

It is certified that error appears in the above-indentified patent and that said Letters Patent is hereby corrected as shown below:

Column 5, line 59, "Thencefore" should be --Therefore--;

Column 6, line 9, "4" should be --6--;

Column 8, line 21, "ok" should be --of--;

Column 9, line 15, "102f103" should be --102, 103--;

Signed and Sealed this

Third Day of September, 1996

Attest:

BRUCE LEHMAN

*Attesting Officer*  *Commissioner of Patents and Trademarks*

US005505464C1

(12) EX PARTE REEXAMINATION CERTIFICATE (8010th)
United States Patent
McGarvey

(10) Number: US 5,505,464 C1
(45) Certificate Issued: Feb. 8, 2011

(54) MINIMUM DEAD VOLUME FITTING

(75) Inventor: Raymond C. McGarvey, Bethesda, MD (US)

(73) Assignee: General Components, Inc., Gaithersburg, MD (US)

Reexamination Request:
No. 90/006,707, Jul. 11, 2003

Reexamination Certificate for:
Patent No.: 5,505,464
Issued: Apr. 9, 1996
Appl. No.: 07/937,560
Filed: Aug. 31, 1992

Certificate of Correction issued Sep. 3, 1996.

Related U.S. Application Data

(63) Continuation-in-part of application No. 07/694,066, filed on May 1, 1991, now Pat. No. 5,222,747, which is a continuation-in-part of application No. 07/652,225, filed on Feb. 6, 1991, now abandoned, which is a continuation of application No. 07/392,460, filed on Aug. 11, 1989, now abandoned.

(51) Int. Cl.
*F16L 17/06* (2006.01)

(52) U.S. Cl. .................. 277/614; 277/626; 285/336; 285/917

(58) Field of Classification Search .............. None
See application file for complete search history.

(56) References Cited

U.S. PATENT DOCUMENTS 4,403,795 A * 9/1983 Davlin ................. 285/184

* cited by examiner

*Primary Examiner*—Alison K Pickard

(57) ABSTRACT

A face sealing fitting includes two connectable tubular elements each having an annular end formation and a metal gasket including an outer annular section with a first axial dimension, an inner annular section concentric with the outer annular section and having a smaller axial dimension, and a tapered section having bevel faces between the inner and outer annular sections. Portions of the annular end formations which project axially the farthest beyond the tubular elements have a diameter substantially equal to the inner diameter of the inner annular gasket section and lie along the inner surface of the tubular elements to minimize dead volumes along the flowpath through the fitting. In some embodiments, the fitting is tightened from a first position, in which the inner diameter of the gasket is smaller than the inner diameter of the first and second tubular elements, to a second position, in which the inner diameter of the tubular gasket is equal to the inner diameter of the first and second tubular elements. In the second position, the fitting is in an optimal sealing condition, and there is zero dead volume in the flowpath.

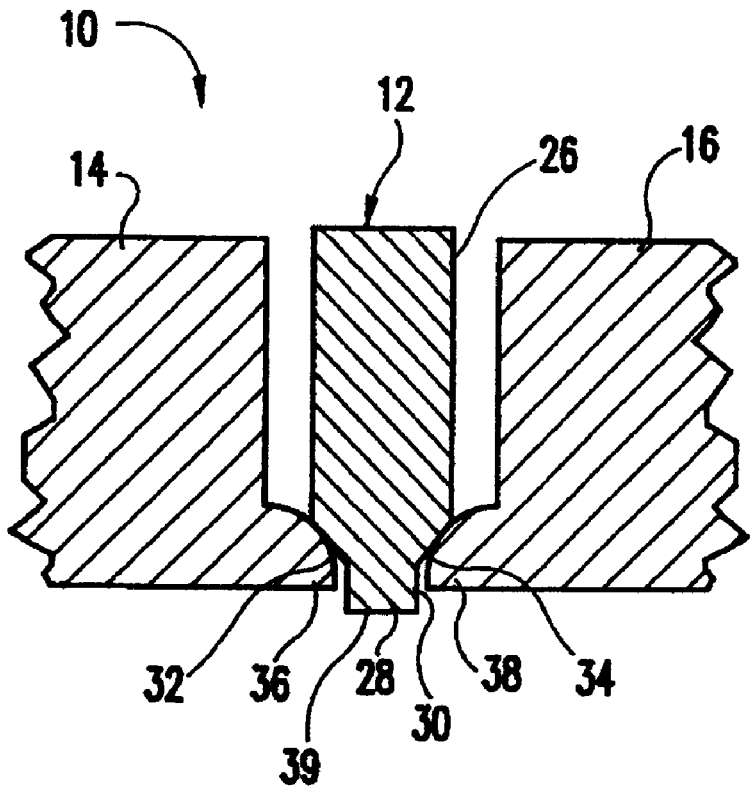

US 5,505,464 C1

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-23 is confirmed.
New claims 24-26 are added and determined to be patentable.

24. A face seal fitting, comprising:
   a first tubular element having an end face, an inner surface defining a flowpath and a first annular end formation projecting axially from the end face of said first tubular element;
   a second tubular element having an end face, an inner surface further defining said flowpath and a second annular end formation projecting axially from the end face of said second tubular element; and
   a metal gasket including an inner section in the form of an annulus having an axis, and
   a tapered section extending radially outward from said inner section, said tapered section defining two bevel faces directed away from one another and inwardly toward the axis of said annulus,
   wherein said first annular end formation engages one of said bevel faces in a first region, said second annular end formation engages the other of said bevel faces in a second region, said first and second annular end formations have portions extending axially the farthest from the end faces of said first and second tubular elements, each said farthest extending portion lies on the inner surface of its associated tubular element and has an inner diameter, and said gasket has an inner diameter substantially equal to the inner diameters of said farthest extending portions, whereby dead volumes along the flowpath through said fitting are minimized wherein said first and second annular end formations each has a rounded profile in axial section defining a sealing surface.

25. A face seal fitting comprising a first conduit having an inner surface defining the outer boundary of a flowpath and having a radial end face having an annular nose projecting from said end face, a second conduit having an inner surface defining the outer boundary of a flowpath and a radial end face having an annular nose projecting from said end face, a metal gasket sandwiched between said end faces and making a sealing engagement with said noses, said gasket having an inner cylindrical surface having substantially the same diameter as the inner surfaces of said first and second conduits where said conduits engage said gasket, means to hold said end faces together sandwiching said gasket therebetween with axial pressure applied to said gasket, said end faces with said noses and said gasket being shaped when fully engaged under axial pressure applied by said means to fit together so that no more than minimal dead spaces are defined between said gasket and said conduits at said inner surfaces and said inner surfaces define the outer boundary of a continuous flow path, wherein said nose has a rounded sealing surface.

26. A face sealing fitting, comprising a first conduit having an inner surface defining the outer boundary of a flow path and having a radial end face having an annular nose projecting from said end face,
   a second conduit having an inner surface defining the outer boundary of a flow path and a radial end face having an annular nose projecting from said end face,
   a metal gasket sandwiched between said end faces and making a sealing engagement with said noses,
   said gasket having an inner cylindrical surface having substantially the same diameter as the inner surfaces of said first and second conduits where said conduits engage said gasket,
   means to hold said end faces together sandwiching said gasket therebetween with axial pressure applied to said gasket,
   said end faces with said noses and said gasket being shaped when fully engaged under axial pressure applied by said means to fit together so that no more than minimal dead spaces are defined between said gasket and said conduits at said inner surfaces and said inner surfaces define the outer boundary of a continuous flow path, and
   wherein said annular noses project from said end faces at a location adjacent to said flow path.

* * * * *